United States Patent [19]

Kim et al.

[11] Patent Number: 5,323,378

[45] Date of Patent: Jun. 21, 1994

[54] COMPACT OPTICAL PICKUP

[75] Inventors: Chun-dong Kim; Young-bok Yu; Hyeon-sub Choi, all of Suwon, Rep. of Korea

[73] Assignee: Samsung Electronics Co., Ltd., Kyungki, Rep. of Korea

[21] Appl. No.: 974,490

[22] Filed: Nov. 12, 1992

[30] Foreign Application Priority Data

Dec. 31, 1991 [KR] Rep. of Korea .................. 91-25694

[51] Int. Cl.[5] .......................................... G11B 7/095
[52] U.S. Cl. ............................. 369/247; 369/44.16; 359/824
[58] Field of Search .................. 369/44.15, 44.16, 247, 369/215, 811, 819, 824, 822, 823

[56] References Cited

U.S. PATENT DOCUMENTS

| 4,766,583 | 8/1988 | Oinoue et al. | 369/44.16 |
| 4,794,580 | 12/1988 | Ikedo et al. | 369/44.16 |
| 4,927,235 | 5/1990 | Narumi | 369/44.15 |
| 5,001,694 | 3/1991 | Lee et al. | 369/44.16 |
| 5,072,433 | 12/1991 | Tamaka | 369/44.16 |
| 5,109,368 | 4/1992 | Ohta et al. | 369/44.16 |

FOREIGN PATENT DOCUMENTS

| 58-64649 | 4/1983 | Japan | 369/44.16 |
| 4-229422 | 8/1992 | Japan | 369/44.16 |

*Primary Examiner*—Stuart S. Levy
*Assistant Examiner*—Paul J. Ditmyer
*Attorney, Agent, or Firm*—Sughure, Mion, Zinn, Macpeak & Seas

[57] ABSTRACT

A compact optical pickup in which the optical elements are mounted on an optic holder driven as a unitary structure. The pickup includes the optic holder having a vertical hole at one end through which a laser beam passes, a horizontal opening which communicates with the vertical hole, an objective lens installed at the top of the vertical hole, a reflection mirror at the juncture of the vertical hole and horizontal opening, and a hybrid optical unit consisting of optical elements positioned at the other end of the optic holder to scan the reflection mirror with the laser beam via the horizontal opening and detect the laser beam reflected from the disk. The pickup further includes a support for suspending the optic holder from a base, simultaneously keeping balance between the objective lens at the one end of the optic holder and the hybrid optical unit at the other, and elastically supporting the optic holder, and a driver for driving the optic holder vertically and horizontally. The objective lens, the laser diode and the photodiode are integrally mounted on the optic holder, so that their optical axes never skew and are always coincident with each other.

8 Claims, 6 Drawing Sheets

COMPACT OPTICAL PICKUP

BACKGROUND OF THE INVENTION

1. Field of the Invention

The present invention relates to an optical pickup which scans an optical recording disk with a light beam, detects the light beam reflected therefrom and outputs an electrical signal so as to reproduce information on the disk, and more particularly to an optical pickup in which optical e elements such as a light generating device, an objective lens and a photodetector are mounted on a holder to be driven as a single body.

2. Background

Optical pickups for scanning an optical recording disk with a light beam and detecting the reflected light beam to output an electrical signal are used for audio/video laser disk players. Further, for use as portable players and in automobiles, small, lightweight laser disk players are required. To accomplish this, the optical pickup, which occupies a relatively large space inside the player, should be lighter and smaller. A small optical pickup enables the miniaturization of the players, and as a rule is favorable for portable use and for use in automobiles. Besides being beneficial for the laser disk player, a lightweight optical pickup greatly contributes to the high speed data processing of a compact disk ROM system or magneto-optical disk drive which is used as a computer's peripheral device.

FIG. 1 illustrates a simplified conventional optical pickup. As shown in FIG. 1, the optical pickup comprises a laser diode 1 for generating a laser beam, a grating 2 for diffracting the laser beam into three beams, a half mirror for passing portions of the incident laser beams and reflecting the remainder, an objective lens 4 for focusing the laser beams on a disk 5, a cylindrical lens 6 for changing the focusing position and shape of the laser beams using astigmatism, and a photodiode 7 for sensing the laser beams reflected by disk 5 and focused by cylindrical lens 6 to detect an electrical signal such as a playback signal or focusing/tracking error signal. In order to compensate for the focusing/tracking error due to the vibration of disk 5, objective lens 4 is mounted on actuator coils 8 so as to be driven in the horizontal and vertical directions with respect to the disk. The entire optical pickup is installed so as to be conveyed in the radial direction of disk 5 by a conveyer such as a voice coil motor (not shown), to seek particular information stored on the disk 5.

Such a mechanical configuration of an optical pickup is divided into two types, a single-body type wherein an objective holder 9 is driven with an optical pickup main body 10 as a single, integral body, and a separated type wherein the objective lens holder 9 is separated from the main body 10 so as to be independently driven. The single-body type is highly desirable because of its stable operation and because few focusing/tracking servo errors occur. However, the single-body type is disadvantageous in that high-speed search operations may not be performed since the actuator coil 8 must drive the entire optical pickup.

Thus, the separated type optical pickup is usually used in computer peripheral devices such as the compact disk ROM system or magneto-optical disk drive, since the actuator load of the separated type is small. However, the critical shortcoming of the separated type is that when the objective lens is moved its optical axis deviates from that of the main body so that aberration of the objective lens becomes larger and servo errors occur frequently.

Referring to FIG. 1, the laser diode 1, objective lens 4 and photodiode 7, are typically arranged in a T-shaped configuration with the half mirror 3 being disposed at the point of intersection. Since such a large space is unnecessarily occupied, this configuration is unfavorable for miniaturizing the optical pickup. In other words, since the conventional optical pickup is generally relatively large and heavy due to its optical element configuration, miniaturization of the player (or drive) and the increase of data processing capability is difficult to achieve.

SUMMARY OF THE INVENTION

Therefore, it is an object of the present invention to provide an optical pickup which is small, and in particular, slim, by reducing the amount of unnecessarily occupied space in the arrangement of optical elements, operates in a stable manner with no deviation of the optical axis of an objective lens from that of a laser diode, and is capable of performing high speed searching of the disk.

In order to accomplish the above object, there is provided an optical pickup for scanning an optical recording disk with a light beam and detecting the light beam reflected therefrom so as to output an electrical signal, comprising: a base; an optic holder having a vertical hole at one end through which the light beam passes, a horizontal opening which communicates with the vertical hole, an objective lens installed at the top of the vertical hole, a reflection mirror at the juncture of the vertical hole and horizontal opening, and a hybrid optical unit consisting of optical elements which is positioned at the other end of the optic holder to scan the optical recording disk with the light beam and detect a reflected light beam; support means for suspending the optic holder from the base and elastically supporting the optic holder so that a state of balance is maintained between the objective lens at the one end of the optic holder and the hybrid optical unit at the other; and driving means for driving the optic holder vertically and horizontally.

The hybrid optical unit is integrated with a laser diode for emitting a light ray (e.g., a laser beam), a photodiode spaced apart from the laser diode by a distance for diffracting the laser beam reflected from the disk, a grating for deflecting the laser beam emitted from the laser diode into three beams and a hologram lens for deflecting the reflected laser beam toward the photodiode, so that the laser beam is projected via the horizontal opening of the optic holder to detect the reflected laser beam.

In the optical pickup of the present invention, the laser beam projected from the hybrid optical unit is reflected by the reflection mirror via the horizontal opening of the optic holder, and directed toward the objective lens positioned at the top of the vertical hole, where it is focused onto the disk. The laser beam reflected from the disk again passes through the objective lens and reflection mirror and is directed toward the hybrid optical unit. Since, in the optical pickup of the present invention, the optical elements of the hybrid optical unit are integrated, they, together with the objective lens and reflection mirror which are mounted on the optic holder, establish an L-shaped configuration. Such a configuration occupies far less space than the conventional arrangement so as to be advantageous for miniaturization of the device. Further, since the hybrid optical unit is integrally united to the optic holder to move in tandem therewith by the driving means, the optical axes of the hybrid optical unit and objective lens are never skewed. As a result, the present invention operates extremely stably, and is relatively compact and light weight so as to be advantageous in high speed data search operations.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE PREFERRED EMBODIMENT

Figure 1:
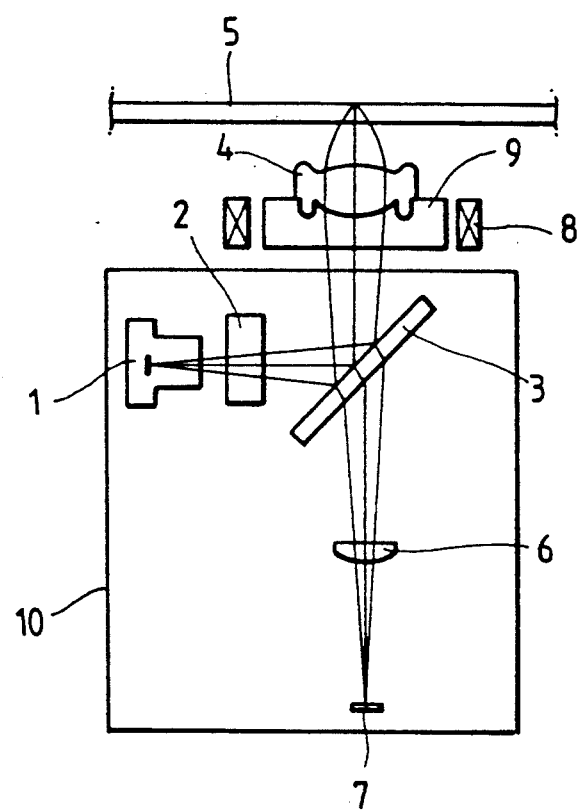
FIG. 1 illustrates the optical arrangement of a conventional optical pickup.
Figure 2:
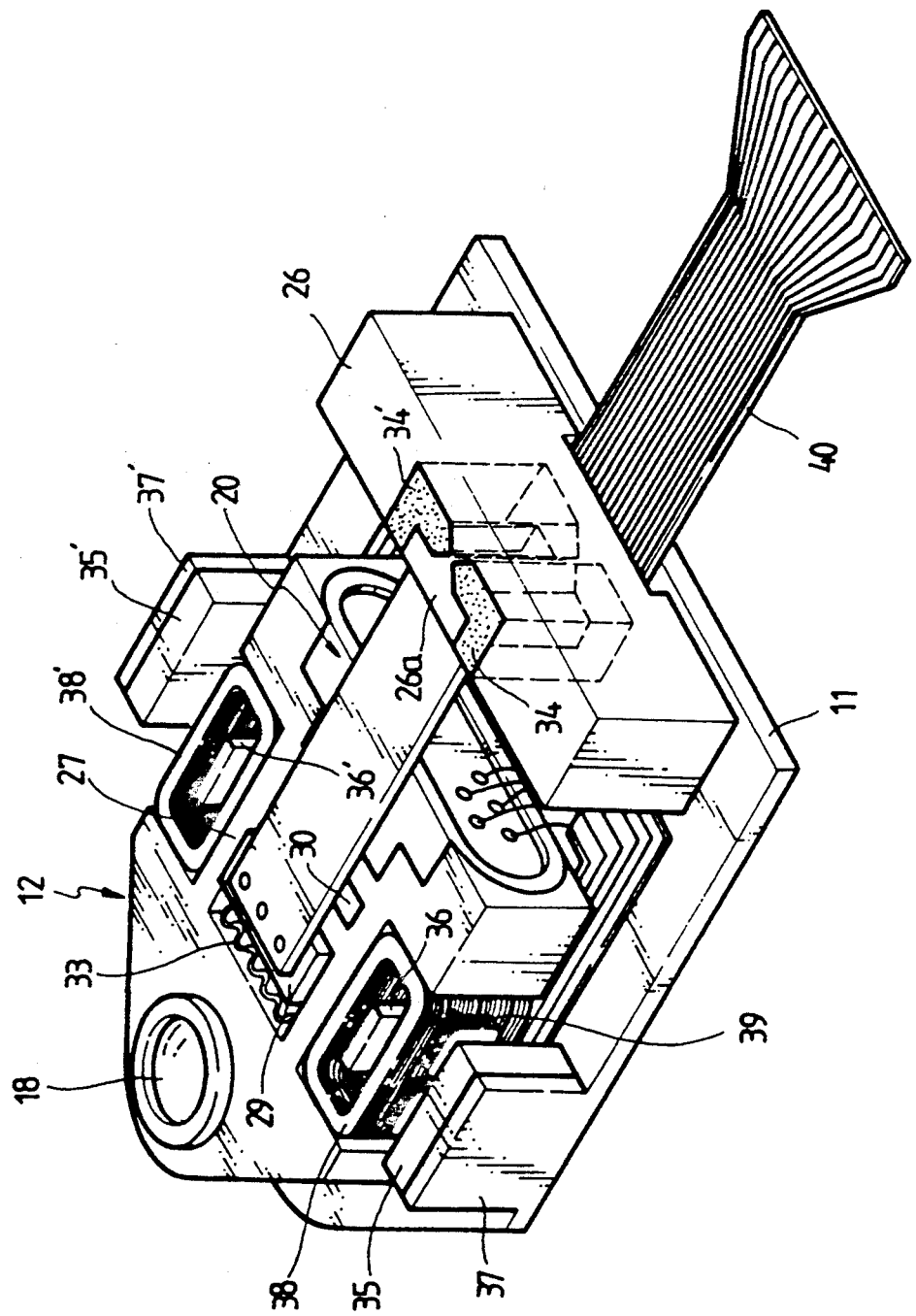
FIG. 2 is a perspective view of an optical pickup of the present invention.
Figure 3:
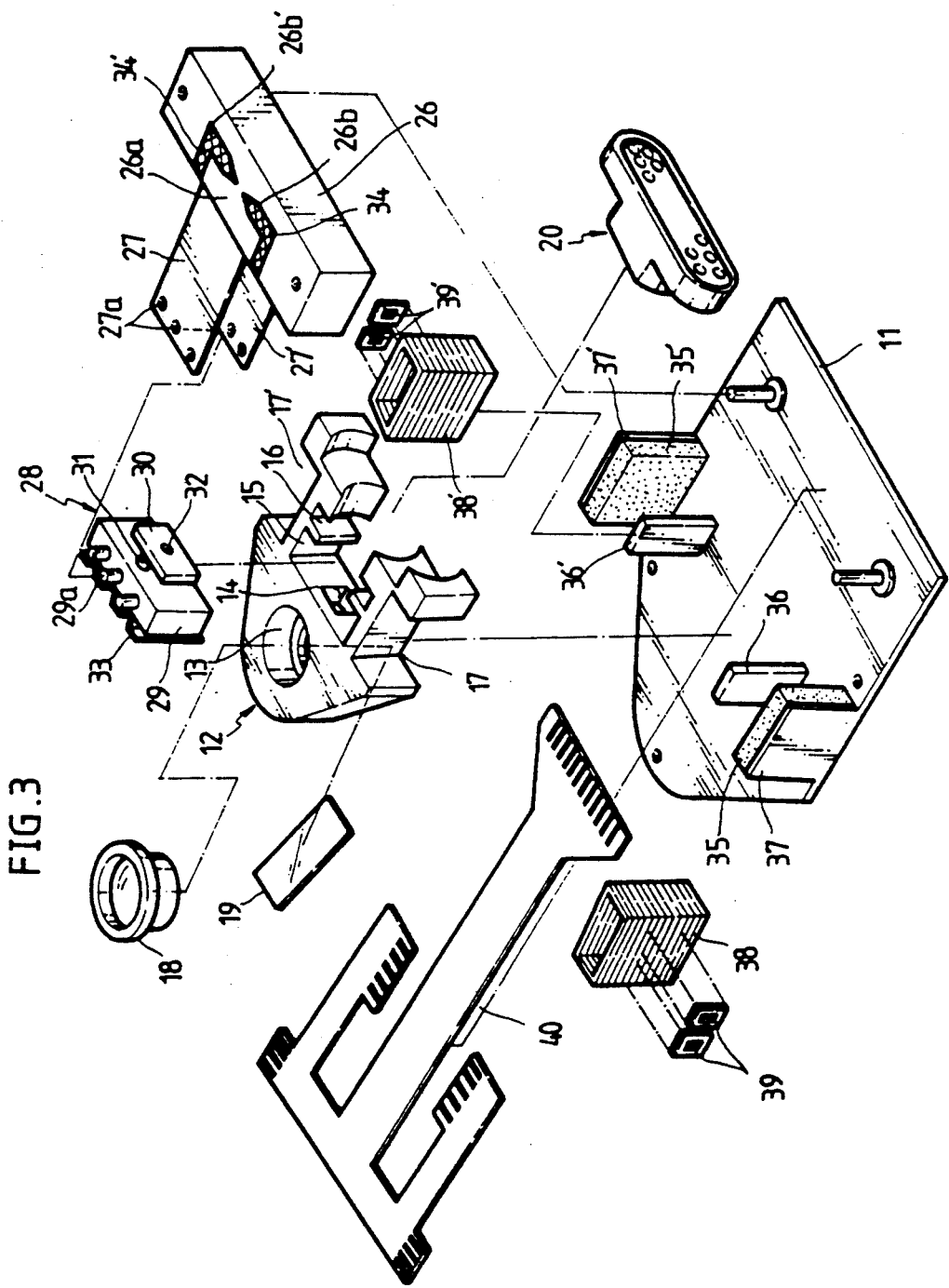
FIG. 3 is an exploded perspective view of an optical pickup of the present invention shown in FIG. 2

Referring to FIGS. 2 and 3, an optic holder 12 is supported on a base 11 and has a vertical hole 13 at the front end and a horizontal opening 14 which communicates with the vertical hole 13 from the rear thereof. An objective lens 18 is installed on the top of the vertical hole 13 and a reflection mirror 19 is installed at the juncture of the vertical hole 13 and the horizontal opening 14. A hybrid optical unit 20 is integrally provided at the rear end of optic holder 12. The optic holder 12 further comprises slots 15 and 16 for receiving a coupling block of supporting means, and coil supports 17 and 17' for fixing an actuator coil of a driving means, as discussed in greater detail below.

Figure 4:
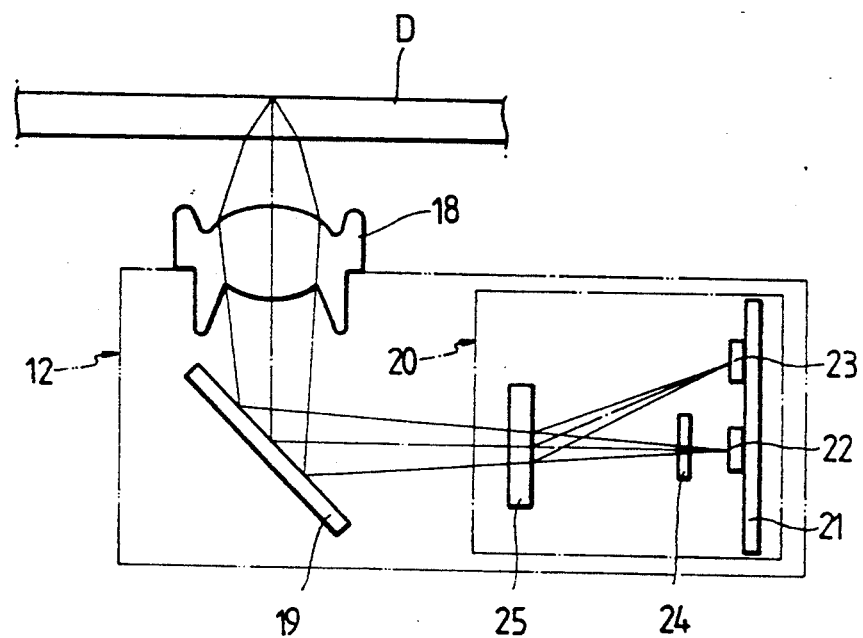
FIG. 4 is a schematic illustration of the optical arrangement of an optical pickup of the present invention.

FIG. 4 illustrates the hybrid optical unit 20 coupled to the rear end of optic holder 12. In FIG. 4, a laser diode 22 is disposed on substrate 21 for emitting a laser beam toward reflection e mirror 19 placed forwardly of the horizontal opening 14. Additionally, a photodiode 23 for detecting the laser beam reflected from the disk is installed above and spaced apart from laser diode 22. In front of laser diode 22 is positioned a grating 24 for diffracting the laser beam into three beams and a hologram lens 25 for deflecting the reflected beam toward the photodiode 23. Consequently, all the optical elements of hybrid optical unit 20 are substantially in line with the horizontal optical axis of reflection mirror 19. Hence, the configuration of the optical elements, objective lens 18 and reflection mirror 19 is L-shaped.

Turning again to FIGS. 2 and 3, the supporting means suspends the optic holder 12 from base 11 and simultaneously provides balanced support thereto. The supporting means comprises a supporting block 26 fixedly installed on the rear portion of base 11, plate springs 27 and 27' extending in parallel toward the front of the optical holder from a forward central portion 26a of the block so as to be respectively positioned above and below the optic holder 12, and a coupling block 28 for connecting the plate springs 27 and 27' to the optic holder 12. The coupling block 28 consists of a spring connector 29 which has welding protrusions 29a for insertion into fixing holes 27a provided in the end of the plate springs 27 and 27', a holder connector 30 which is fitted tightly into holder connector receiving slot 16 of optic holder 12, and hinges 31 for allowing the connectors 29 and 30 to be horizontally rotated with respect to each other about a vertical axis. A through hole 32 is formed in coupling block 28 in alignment with the opening 14 of the optical holder to permit the laser beam to pass therethrough.

Figure 6:
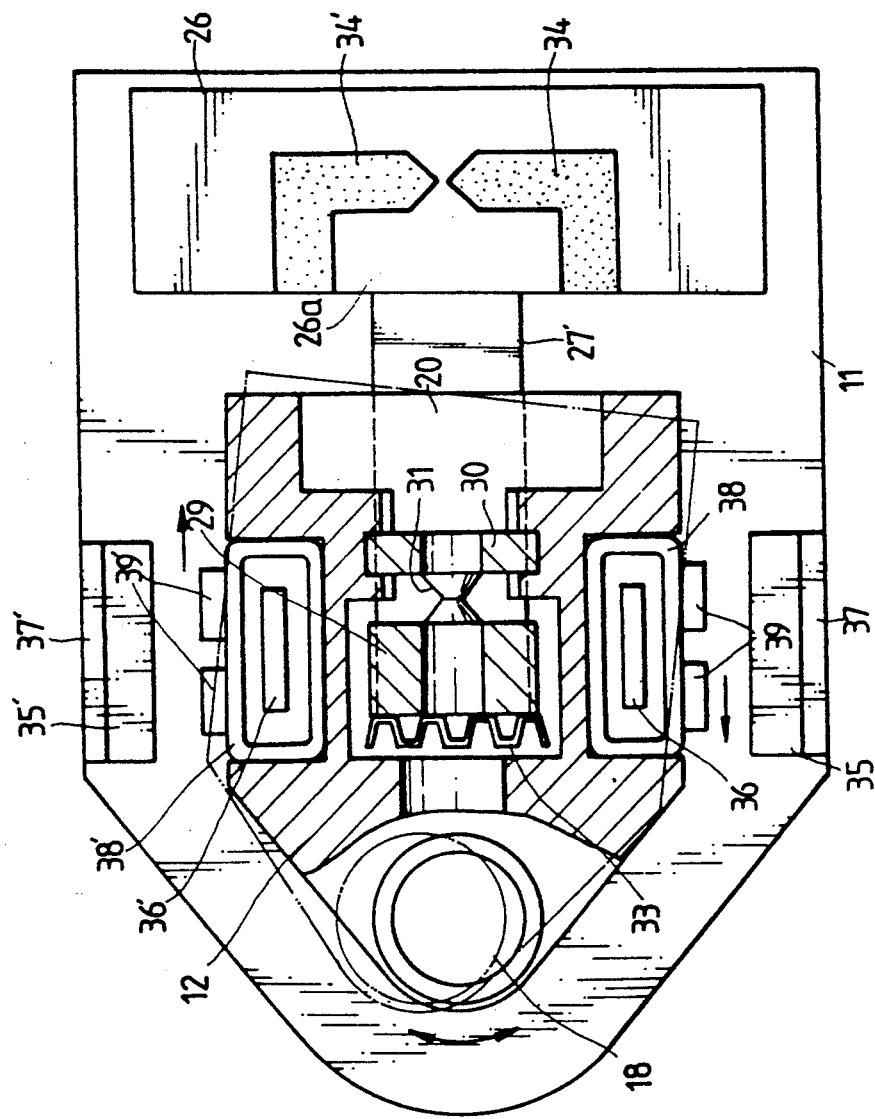
FIG. 6 is a sectional top view of an optical pickup of the present invention which illustrates the tracking operation of the objective lens

The spring connector 29 of coupling block 28 is loosely inserted into spring connector receiving slot 15 of optic holder 12. Thereafter, a corrugated rubber pad 33 is inserted between optic holder 12 and spring connector 29 to prevent secondary vibration due to the contact therebetween. As illustrated in FIGS. 2, 3 and 6, excisions 26b and 26b' are formed on either side of the forward central portion 26a of the supporting block 26 for supporting plate springs 27 and 27' and elastomers 34 and 34' are disposed in the excisions 26b and 26b' so that external impact is absorbed by the elastomers so as to not be transmitted to the optic holder.

The plate springs 27 and 27' are deformable to enable the vertical movement of optic holder 12, and subsequent return to a horizontal state of equilibrium, so that optic holder 12 is always suspended at a certain height. Further, the optic holder 12 is able to pivot slightly on hinges 31 of connecting block 28, to enable the horizontal movement of objective lens 18. As a result, vertical movement and horizontal rotation of optic holder 12 can be performed using a driving means, discussed below, to enable the control of the focusing and tracking position of objective lens 18. The hybrid optical unit 20, disposed at the end portion of optic holder 12, moves in correspondence with the movement of the objective lens 18 so as to maintain a fixed orientation with respect thereto.

The driver for driving the optic holder 12 in the vertical and horizontal directions includes magnets 35 and 35', inner and outer yoke piece pairs 36, 36' and 37, 37' for forming a magnetic path therefor, actuator coils 38 and 38' for driving optical pickup in the vertical direction, and actuator coil pairs 39 and 39' for driving the pickup in the horizontal direction. The inner and outer yoke piece pairs 36, 36' and 37, 37' are installed on base 11 and the magnets 35 and 35' are adhered to the outer yoke pieces 37 and 37'. The actuator coils 38 and 38' for driving the optic holder in the vertical direction are adhered to coil supports 17 and 17' of the optic holder 12 while horizontal driving actuator coil pairs 39 and 39' are adhered to coils 38 and 38', respectively. The vertical driving actuator coils 38 and 38' are positioned so as to loosely circumscribe inner yoke pieces 36 and 36' so that one side of each coil is influenced by the magnetic flux of magnets 35 and 35'.

A thin flexible printed circuit board 40 is mounted on the base 11 for connecting laser diode 22, photodiode 23 and vertical and horizontal actuator coils 38, 38' and 39, 39', which belong to hybrid optical unit 20, to external circuitry (not shown). The optical pickup assembly can be conveyed by mounting the assembly on a carriage of a conveyer such as a voice coil motor in a disk drive (not shown).

FIG. 4 schematically illustrates the optical arrangement of the optical elements of the optical pickup. In FIG. 4, among the optical elements of the optical pickup of the present invention, the optical axis extending from the laser diode 22 of hybrid optical unit 20 to the objective lens 18 of optic holder 12 constitutes an L-shaped configuration. Further, using the hologram lens 25, photodiode 23 for detecting the reflected laser beam can be arranged substantially in line with the laser diode 22, as illustrated. This arrangement results in a device which has a relatively thin exterior shape occupying less space in general.

The operation of the optical pickup according to the embodiment of the present invention will be described below.

The laser beam emitted from the laser diode 22, incorporated in hybrid optical unit 20, is diffracted into three beams by grating 24. Each diffracted beam passes through hologram lens 25 and is then reflected by mirror 19 towards objective lens 18. The objective lens 18 focuses each diffracted beam onto disk D. Each of the diffracted beams reflected by disk D returns to hologram lens 25 via objective lens 18 and reflection mirror 19. Thereafter, the hologram lens 25 directs each diffracted beam to photodiode 23. While not described in detail, photodiode 23 includes a plurality of regions where a zero-difference and plus-and minus-differences are sensed, respectively, based on the three diffracted beams produced by grating 24. Thus, photodiode 23 generates a reproducing signal and a focusing/tracking error signal by techniques well understood by those of ordinary skill in the art. It will be noted that the tracking error signal is detected when disk D is moved horizontally or vertically during operation. The error signal is applied to coils 38, 38′ and 39, 39′ via a certain circuit to compensate for the focusing/tracking error of objective lens 18.

Figure 5:
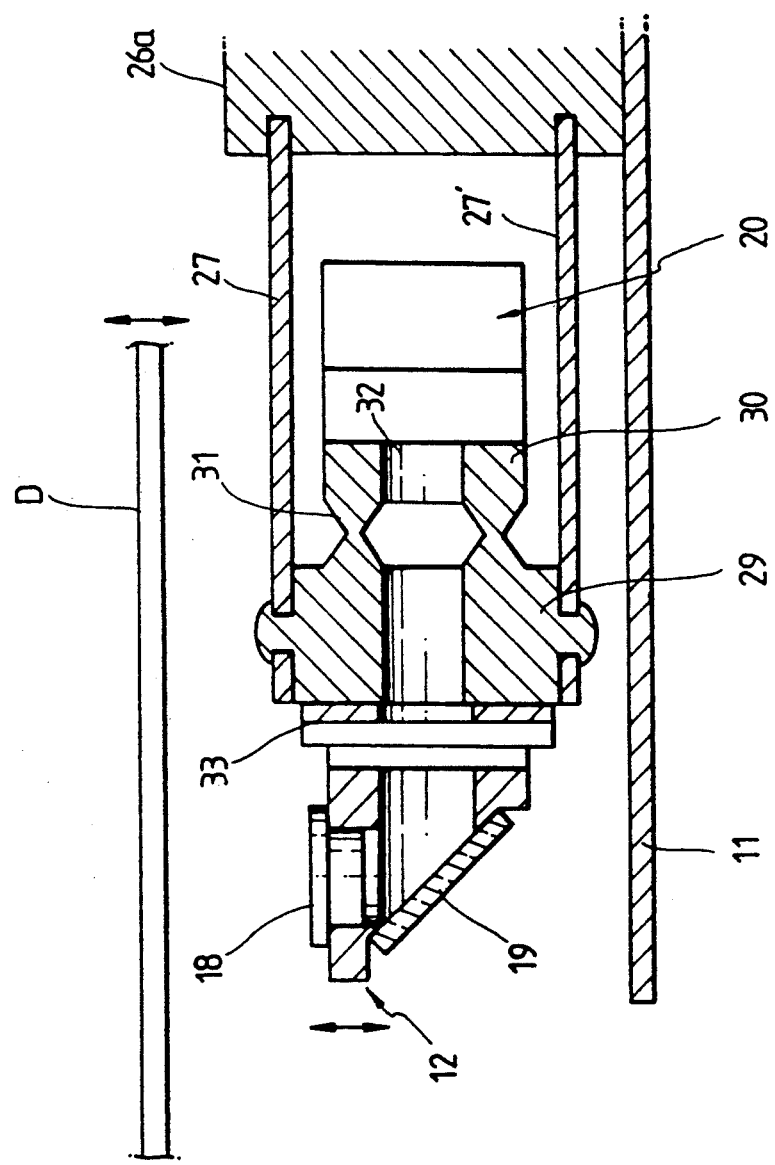
FIG. 5 is a sectional side view of an optical pickup of the present invention which illustrates the focusing operation of the objective lens.

When the focusing error signal is applied to vertical driving actuator coils 38 and 38′, they produce a vertical force between magnets 35 and 35′. Thus, the optic holder 12, as shown in FIG. 5, is subject to the same movement or vibration as disk D and the objective lens 18 maintains a predetermined distance from disk 41. This is the compensation for the focusing error.

Next, the tracking error signal is applied to horizontal driving actuator coil pairs 39 and 39′, so that they produce a horizontal force between magnets 35 and 35′. When the forces generated by the respective coils are equal and in the same direction the optical holder 12 remains stationary. However, it is noted that the two coils are wound in opposite directions such that a current flowing therethrough in the same direction causes the optic holder 12 to rotate in the manner illustrated in FIG. 6. Specifically, the spring connector 29 of connecting block 28 which is fixed to plate springs 27 and 27′ remains stationary while the holder connector 30, and attendantly the optic holder, rotates about hinges 31. When optic holder 12 pivots horizontally, objective lens 18 at one end thereof moves likewise to compensate for the tracking error created due to the horizontal vibration of the disk.

As described above, since the optical elements (e.g., objective lens 18, laser diode 22 and photodiode 23) are integrally mounted on optic holder 12 which moves vertically and pivots in the horizontal direction, their optical axes never skew and are always coincident with each other. Therefore, focusing/tracking servo errors for compensating for offset in the optical axis rarely occur.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. An optical pickup for scanning an optical recording disk with a laser beam and detecting the laser beam reflected therefrom so as to output an electrical signal, comprising:

a base;

an optic holder having a vertical hole at one end through which said laser beam passes and a horizontal opening which communicates with said vertical hole, said optical holder including an objective lens installed at the top of said vertical hole, a reflection mirror disposed at the juncture of said vertical hole and horizontal opening, and a hybrid optical unit, including optical elements, positioned at the other end of said optic holder and integral thereto to project said laser beam onto said reflection mirror via said horizontal opening and detect the laser beam reflected from said disk;

support means for suspending said optic holder from said base and elastically supporting said optic holder such that said optic holder can move vertically and horizontally; and driving means for driving said optic holder vertically and horizontally, wherein said support means includes a support block fixedly installed at one end of said base, plate springs extending in parallel toward the one end of said holder from a central portion of said support block, and a coupling block coupled to said central portion of said optic holder, so as to connect said optic holder with said plate springs while allowing for slight horizontal rotation, and wherein excisions are formed on opposite sides of said central portion of said support block to allow said forward central portion to be resilient with respect to opposite sides thereof, and an elastomer fills said excisions to absorb external impacts.

2. An optical pickup as claimed in claim 1, wherein said hybrid optical unit is integrated with a laser diode for projecting said laser beam, a photodiode for detecting a reflected laser beam, a grating for diffracting said laser beam projected from said laser diode into three beams and a hologram lens for deflecting said reflected laser beam toward said photodiode.

3. An optical pickup as claimed in claim 1, wherein said driving means has magnets adhered to outer yoke pieces, inner and outer yoke piece pairs installed on said base for forming a magnetic path therefor, actuator coils for vertical driving said optic holder installed on either side of said optic holder to loosely embrace said inner yoke pieces, and actuator coil pairs for horizontal driving said optic holder adhered to said actuator coils.

4. An optical pickup for scanning an optical recording disk with a laser beam and detecting the laser beam reflected therefrom so as to output an electrical signal, comprising:

a base;

an optic holder having a vertical hole at one end through which said laser beam passes and a horizontal opening which communicates with said vertical hole, said optical holder including an objective lens installed at the top of said vertical hole, a reflection mirror disposed at the juncture of said vertical hole and horizontal opening, and a hybrid optical unit, including optical elements, positioned at the other end of said optic holder and integral thereto to project said laser beam onto said reflection mirror via said horizontal opening and detect the laser beam reflected from said disk;

support means for suspending said optic holder from said base and elastically supporting said optic holder such that said optic holder can move vertically and horizontally; and driving means for driving said optic holder vertically and horizontally, wherein said support means includes a support block fixedly installed at one end of said base, plate springs extending in parallel toward the one end of said holder from a central portion of said support block, and a coupling block coupled to said central portion of said optic holder, so as to connect said optic holder with said plate springs while allowing for slight horizontal rotation, and wherein said coupling block consists of a spring connector connected with said plate springs and loosely inserted into said optic holder, a holder connector tightly fitted into said optic holder, a hinge or connecting said spring connector and said holder connector which enables their horizontal rotation with respect to each other, and a beam passing hole which corresponds to said horizontal opening of said optic holder.

5. An optical pickup as claimed in claim 4, wherein a pad is interposed between said optic holder and said spring connector to prevent vibration caused due to the contact therebetween.

6. An optical pickup for scanning an optical recording disk with a plurality of laser beams and detecting reflected laser beams therefrom and producing an electrical signal, comprising:

a hybrid optical unit comprising:
 a laser diode for projecting a first laser beam;
 a grating for diffracting said first laser beam projected from said laser diode into said plurality of laser beam;
 a photodiode for detecting said reflected laser beams generated by reflection of said plurality of laser beams from the disk; and
 a hologram lens for deflecting said reflected laser beams toward said photodiode;

an optic holder having a vertical hole at one end, a horizontal opening intersecting said vertical hole, an objective lens installed at the top of said vertical hole and a reflection mirror located at the intersection of said vertical hole and said horizontal opening, wherein said vertical hole, said horizontal opening, said objective lens and said reflection mirror define a bi-directional optical path for routing said laser beams to the disk and said reflected laser beams to said photodiode, and wherein said optic holder is fixed to said hybrid optical unit;

spring means for permitting simultaneous limited vertical movement of said optic holder and said hybrid optical unit in response to a first applied force;

a hinge disposed between said grating and said reflection mirror permitting simultaneous horizontal rotation of said hybrid optical unit and said holder in response to a second applied force;

a base; and support means connected to said spring means for suspending said optic holder from said base, wherein said support means comprises a support block fixedly installed at one end portion of said base, wherein said spring means comprises a plurality of plate springs extending in parallel toward said objective lens from a forward central portion of said support block, wherein said optical pickup further comprises a coupling block connected between a central portion of said optic holder and said plate springs, and wherein said support block comprises elastomer-filled excisions on opposite sides of said forward central portion of said support block for permitting said forward central portion to be resilient and to absorb external impacts.

7. An optical pickup for scanning an optical recording disk with a plurality of laser beams and detecting reflected laser beams therefrom and producing an electrical signal, comprising:

a hybrid optical unit comprising:
 a laser diode for projecting a first laser beam;
 a grating for diffracting said first laser beam projected from said laser diode into said plurality of laser beams;
 a photodiode for detecting said reflected laser beams generated by reflection of said plurality of laser beams for the disk; and
 a hologram lens for deflecting said reflected laser beams toward said photodiode;

an optic holder having a vertical hole at one end, a horizontal opening intersecting said vertical hole, an objective lens installed at the top of said vertical hole and a reflection mirror located at the intersection of said vertical hole and said horizontal opening, wherein said vertical hole, said horizontal opening, said objective lens and said reflection mirror define a bi-directional optical path for routing said laser beams to the disk and said reflected laser beams to said photodiode, and wherein said optic holder is fixed to said hybrid optical unit;

spring means for permitting simultaneous limited vertical movement of said optic holder and said hybrid optical unit in response to a first applied force;

a hinge disposed between said grating and said reflection mirror permitting simultaneous horizontal rotation of said hybrid optical unit and said holder in response to a second applied force;

a base; and support means connected to said spring for suspending said optic holder from said base, wherein said support means comprises a support block fixedly installed at one end portion of said base, wherein said spring means comprises a plurality of plate springs extending in parallel toward said objective lens from a forward central portion of said support block, wherein said optical pickup further comprises a coupling block connected between a central portion of said optic holder and said plate springs and wherein said coupling block comprises:
 a spring connector connected with said plate springs and loosely inserted into said optic holder;
 a holder connector tightly fitted into said optic holder; and
 said hinge, said hinge having a beam passing hole which corresponds to said horizontal opening of said optic holder; wherein said hinge connects said spring connector and said holder connector to permit their horizontal rotation with respect to each other.

8. The optical pickup of claim 7, wherein a pad is inserted between said optic holder and said spring connector to prevent vibration due to contact therebetween.

* * * * *